(12) United States Patent
Johnson et al.

(10) Patent No.: US 7,641,430 B2
(45) Date of Patent: Jan. 5, 2010

(54) NUT PLATES AND THREADED INSERTS AND METHODS OF ASSEMBLING AND INSTALLING THE SAME

(75) Inventors: Timothy H. Johnson, Seattle, WA (US);
Leonard F. Reid, Issaquah, WA (US);
Charles M. Copple, Puyallup, WA (US);
June Denise Copple, legal representative, Puyallup, WA (US);
James R. Ross, Seattle, WA (US)

(73) Assignee: Fatigue Technology, Inc., Seattle, WA (US)

( * ) Notice: Subject to any disclaimer, the term of this patent is extended or adjusted under 35 U.S.C. 154(b) by 323 days.

(21) Appl. No.: 11/445,951

(22) Filed: Jun. 2, 2006

(65) Prior Publication Data

US 2007/0048107 A1   Mar. 1, 2007

Related U.S. Application Data

(60) Provisional application No. 60/687,228, filed on Jun. 3, 2005.

(51) Int. Cl.
*F16B 39/24* (2006.01)
(52) U.S. Cl. .................. 411/132; 411/108; 411/113
(58) Field of Classification Search .............. 411/132, 411/108, 111, 113, 134, 176, 183
See application file for complete search history.

(56) References Cited

U.S. PATENT DOCUMENTS

| | | | | |
|---|---|---|---|---|
| 3,698,278 A | * | 10/1972 | Trembley | 411/34 |
| 4,295,766 A | * | 10/1981 | Shaw | 411/113 |
| 5,135,340 A | * | 8/1992 | Stinson | 411/34 |
| 5,245,743 A | * | 9/1993 | Landy et al. | 29/523 |
| 5,704,747 A | * | 1/1998 | Hutter et al. | 411/70 |
| 7,059,816 B2 | * | 6/2006 | Toosky | 411/181 |
| 7,114,900 B2 | * | 10/2006 | Toosky | 411/108 |
| 7,237,614 B2 | * | 7/2007 | Hitchon | 166/378 |
| 2003/0091408 A1 | | 5/2003 | Toosky | 411/181 |
| 2005/0163589 A1 | * | 7/2005 | Wilson | 411/134 |
| 2006/0045649 A1 | | 3/2006 | Johnson et al. | 411/38 |
| 2006/0078399 A1 | | 4/2006 | Coddington et al. | 411/38 |

* cited by examiner

*Primary Examiner*—Gary Estremsky
(74) *Attorney, Agent, or Firm*—Seed Intellectual Property Law Group PLLC

(57) ABSTRACT

This disclosure relates to a pre-assembled fastener assembly having a retainer, a nut member, and a cold expansion mandrel that is forcibly removable after the assembly is installed into an opening of a structural workpiece. The mandrel is captured between a portion of a retainer and a portion of a nut member. The forced removal of the mandrel expands the retainer into the opening, securing the fastener assembly therein. The assembly may also include a cap coupled to the retainer to seal the opening in the structural workpiece. The nut member can be fixed or free-floating with respect to the retainer. In addition, the nut member can be threaded to receive a fastener. The mandrel is recyclable or disposable.

24 Claims, 12 Drawing Sheets

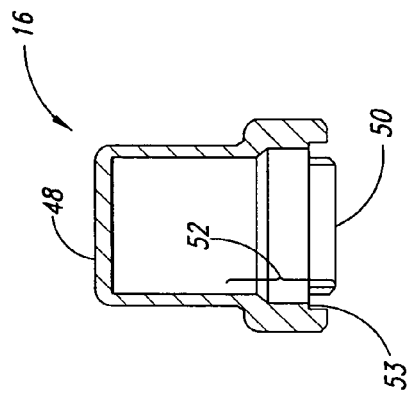
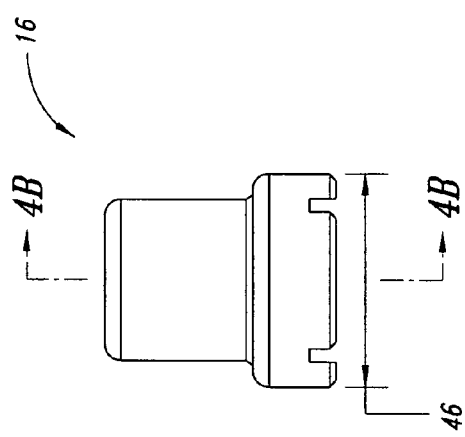
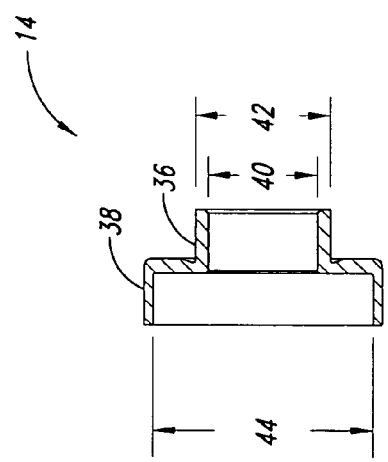
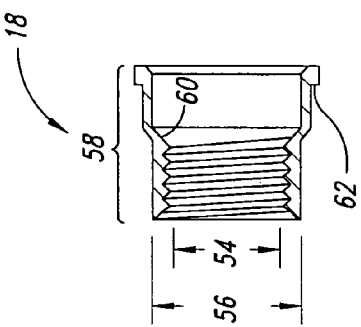
FIG. 3
FIG. 4A
FIG. 4B
FIG. 5

NUT PLATES AND THREADED INSERTS AND METHODS OF ASSEMBLING AND INSTALLING THE SAME

CROSS-REFERENCE TO RELATED APPLICATION

This application claims the benefit under 35 U.S.C. § 119 (e) of U.S. Provisional Patent Application No. 60/687,228, filed Jun. 3, 2005, where this provisional application is incorporated herein by reference in its entirety.

BACKGROUND OF THE INVENTION

1. Field of the Invention

This disclosure relates to a sealing and/or fastener assembly that is pre-assembled with a removable mandrel.

2. Description of the Related Art

A threaded insert is a fastener assembly that is typically installed into sheet (i.e., thin) material. The threaded insert is comprised of a collar and a nut member where the collar and nut member are fixed relative to each other. The collar is generally swaged into an opening of a structural workpiece. The nut member is configured to receive an externally threaded component, for example a bolt or a screw, after the insert has been secured into the structural workpiece. One type of threaded insert is described in detail in U.S. patent application Ser. No. 10/928,641 and in U.S. patent application Ser. No. 10/965,233. The disclosed threaded inserts are installed by collapsing a portion of the collar onto the structural workpiece and contemporaneously, radially expanding another portion of the collar into the opening of the structural workpiece using an installation tool and mandrel.

The mandrel performs the radial expansion process. The mandrel must be of the proper size to achieve the correct amount of radial expansion. Thus, a large variety of different sized mandrels must be kept in stock for different sized openings and/or for rework procedures. When installing threaded inserts and/or nut plates into openings of various sizes, the mandrel must be removed from the installation tool and replaced with the proper sized mandrel. This tedious and time-consuming process may occur numerous times for each specific installation.

A nut plate is comprised of an attachment member coupled to a nut member in contrast to a threaded insert, the nut plate permits the nut member to float or move relative to the attachment member. The attachment member can be a plate, a collar, a barrel, or some other structure. A nut plate in which the attachment member is a plate is installed by riveting the plate to the structural workpiece.

Another type of nut plate in which the attachment member is a collar is installed by radially expanding a portion of the collar into the opening of the structural workpiece using the above-described mandrel. The radial expansion creates a high interference fit between the collar and the structural workpiece that allows the nut plate to resist torque and axial push/pull-out. In addition, the radial expansion of the collar into the opening may induce compressive residual stresses into the surrounding material of the structural workpiece. The compressive residual stresses may increase the fatigue performance of the structural workpiece in the vicinity of the opening. A nut plate that is installed via the radial expansion method eliminates satellite holes that are required for riveted nut plates. The satellite holes can be initiation points for fatigue cracks.

Both the threaded inserts and nut plates may or may not be sealed. For example, sealed threaded inserts and nut plates may be used in fuel tanks or other areas that may be exposed to fluids. In the sealed embodiment, a cap or dome fits over the nut member of the threaded insert or nut plate. With respect to nut plates, the cap is typically attached after the nut plate has been installed into the opening of the structural workpiece. However for threaded inserts, U.S. patent application Ser. No. 10/965,233 discloses a cap that is pre-assembled with the collar and nut member of the threaded insert.

There is a need for a lightweight nut plate that can be installed quickly and efficiently into the structural workpiece.

SUMMARY OF THE INVENTION

In one aspect, a fastener assembly installable in an opening of a structural workpiece via a work tool includes an elongated mandrel having a first end, a second end opposed to the first end, a head section formed proximate the first end, and an engagement section formed proximate the second end, at least a portion of the head section having an outer tapered perimeter formed by a first perimeter tapering down to a second perimeter, and wherein the engagement section is selectively engageable by the work tool; a nut member having a passage formed therein, the passage including a first section and a second section, the first section having a first inner perimeter, the second section having a second inner perimeter that is larger than the first inner perimeter, wherein a transition between the first inner perimeter and the second inner perimeter forms a nut member shoulder; and a retainer having a first section and a second section, the first section cooperates with the nut member to capture the head section of the mandrel substantially between the nut member shoulder and a portion of the retainer until the mandrel is forcibly withdrawn from the retainer, the second section includes a second inner perimeter sized to be slightly smaller than the second perimeter of the head section of the mandrel. In some embodiments, the work tool is a removal tool having an internally threaded passageway configured to couple with the engagement section of the mandrel. After the work tool is threadably coupled to the engagement section, the work tool can be used to pull the mandrel through the retainer. In some variations, the work tool is a gripper or other suitable device for applying a force (e.g., an axial force) to the mandrel so as to forcibly pull the mandrel from the fastener assembly.

In another aspect, a fastener assembly configured to be installed in an opening of a structural workpiece includes a first component having an outer perimeter and an inner perimeter; a retainer having a first section and a second section, the first section having an inner perimeter sized to closely receive the first component, the second section having an inner perimeter and an outer perimeter, the outer perimeter of the second section sized to be closely received by the opening of the structural workpiece; a nut member having an outer perimeter and an inner perimeter, at least a portion of the outer perimeter configured to be received by the first component, the inner perimeter formed about a nut member passage; and a mandrel having a tapered head section and an engagement section, the tapered head section having a first outer perimeter spaced apart from a second outer perimeter with a tapered surface formed therebetween, at least a portion of the tapered head section larger than the inner perimeter of the second section of the retainer, the tapered head section located within the nut member passage until the tapered head section of the mandrel is forcibly pulled to radially expand the inner perimeter of the second section of the retainer.

In yet another aspect, a method for manufacturing a fastener assembly includes inserting a nut member into an open end of a first component, the nut member being axially constrained in a first direction by a portion of the first component; inserting a tapered head section of a mandrel at least partially into the nut member, an elongated portion of the mandrel extending from the tapered head section of the mandrel; and engaging an inner perimeter of a first section of a retainer with an outer perimeter of the first component, the retainer having a second section with an inner perimeter sized to maintain the tapered head section of the mandrel substantially within the nut member until the tapered head section is forcibly removed from the fastener assembly.

In still yet another aspect, a fastener assembly installable in an opening of a structural workpiece includes means for retaining the fastener assembly in the opening of the structural workpiece, the means for retaining having an outer perimeter of a first section sized to be closely received by the opening; and means for radially expanding the first section of the means for retaining, the means for radially expanding forming part of the fastener assembly until the means for radially expanding is forcibly removed from the fastener assembly.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 3 is a cross sectional view of the retainer of the sealed nut plate of FIG. 1.

FIG. 4A is a side elevational view of the cap of the sealed nut plate of FIG. 1.

FIG. 4B is a cross sectional view of the cap of FIG. 4A.

FIG. 5 is a cross sectional view of the nut member of the sealed nut plate of FIG. 1.

DETAILED DESCRIPTION OF THE INVENTION

Figure 1:
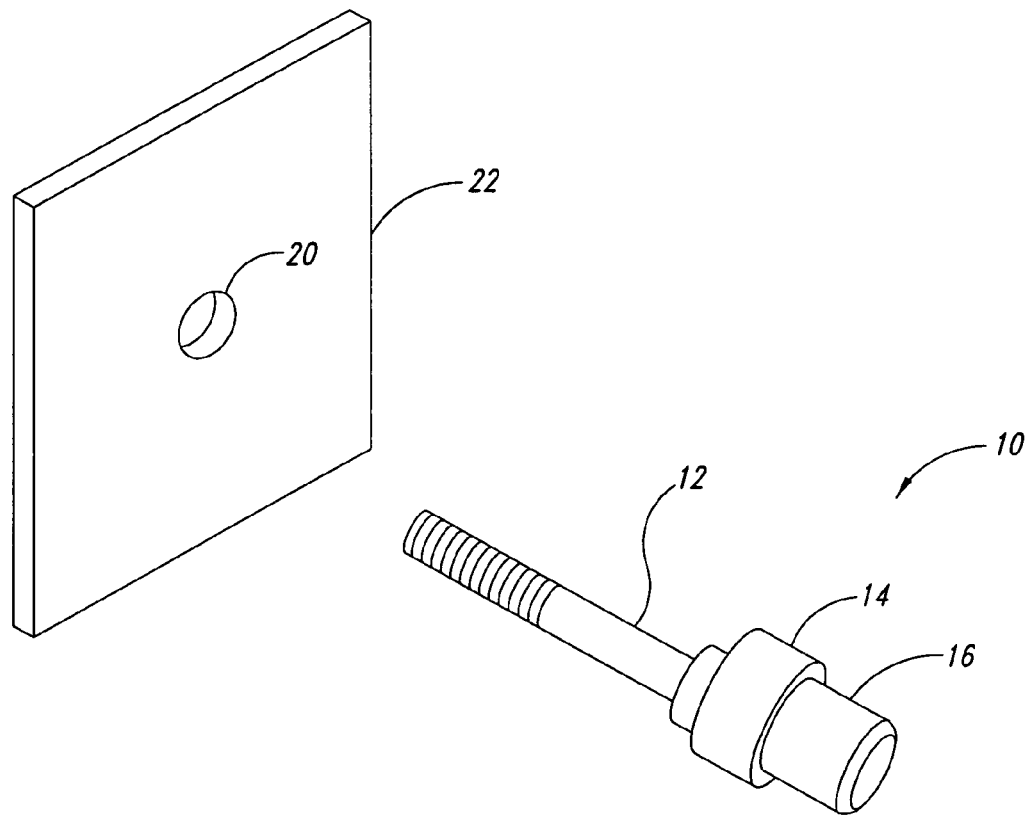
FIG. 1 is a top, left isometric view of a structural workpiece and a sealed nut plate comprising a mandrel, a retainer, a cap, and a nut member according to one illustrated embodiment.

In the following description, certain specific details are set forth in order to provide a thorough understanding of various embodiments of the invention. However, one skilled in the art will understand that the invention may be practiced without these details. In other instances, well-known structures associated with fastener assemblies, their assembly, and/or their installation have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

The use of the terms "nut plate," "threaded insert," and/or "nut member" herein refers to a fastener receiving element or assembly that may or may not be threaded. A threaded version is configured to receive an externally threaded fastener such as a bolt or screw, whereas a non-threaded version is configured to receive a rod, shaft, bushing, some other non-threaded device, or simply used to seal the opening in the structural workpiece. Further, for purposes of the description herein, a "nut plate" includes at least one element that floats or is moveable with respect to a retainer of the nut plate. In some embodiments, the nut plate can include a plate or plate-like member that engages a workpiece. In other embodiments, the nut plate can have a generally flat surface for engaging the workpiece. As described below, the nut plate can comprise a retainer configured to contact the workpiece when the nut plate is installed. Thus, the nut plate may or may not include plate or plate-like component. A "threaded insert," does not have an element that floats or moves with respect to a retainer of the nut plate.

The headings provided herein are for convenience only and do not interpret the scope or meaning of the claimed invention.

The following description relates to a type of pre-assembled nut plate having a captured, cold-expansion mandrel and a floating nut member. The description further relates to a type of pre-assembled threaded insert having a captured, cold-expansion mandrel and a nut member fixed with a collar. For purposes of this description and for clarity, the nut plate will be described and then a description of the threaded insert will follow.

At least one purpose of the nut plate and/or threaded insert is to provided at least one fastening point in a structural workpiece so that an attachment bolt, for example for an accessory component, can be quickly inserted and secured into the nut plate or threaded insert. For example, nut plates and/or threaded inserts can be installed into a web of a wing box during production of an airplane. With the nut plates and/or threaded inserts already installed, a fuel pump or other device can be attached to the web later in the production cycle.

Sealed Nut Plate

A pre-assembled nut plate can be easily and quickly installed into an opening of a structural workpiece by pulling a captured, cold-expansion mandrel through a retainer, thus radially expanding the retainer, which is received by the opening in the structural workpiece according to one embodiment. A puller or installation tool is used to pull the mandrel through the retainer. The pre-assembled nut plate, according to one embodiment, further includes a cap coupled to the retainer for sealing the opening in the structural workpiece once the nut plate is installed. Thus, there is no need to attach the cap after the retainer has been radially expanded.

The radial expansion of the retainer creates a tight or interference fit between the pre-assembled nut plate and the structural workpiece, making the nut plate resistant to torque and/or push/pull-out. The radial expansion process secures the nut plate into the structural workpiece and then a standard screw or bolt may be inserted therein. In addition, the radial expansion process may introduce beneficial residual compressive stresses in the structural workpiece. The residual compressive stresses provide the structural workpiece with an improved resistance to fatigue cracking and may even provide some measure of crack retardation (i.e., slowed crack growth).

FIG. 1 illustrates a nut plate 10 having a removable mandrel 12, a retainer 14, and a cap 16. The nut plate 10 is installed into an opening 20 of a structural workpiece 22 such that the nut member within the cap 16 can receive a fastener. The nut plate 10 is installed by radially expanding a portion of the retainer 14 as described in more detail below.

FIGS. 2A-5 show the various components of the nut plate 10 according to the illustrated embodiments.

Figure 2A:
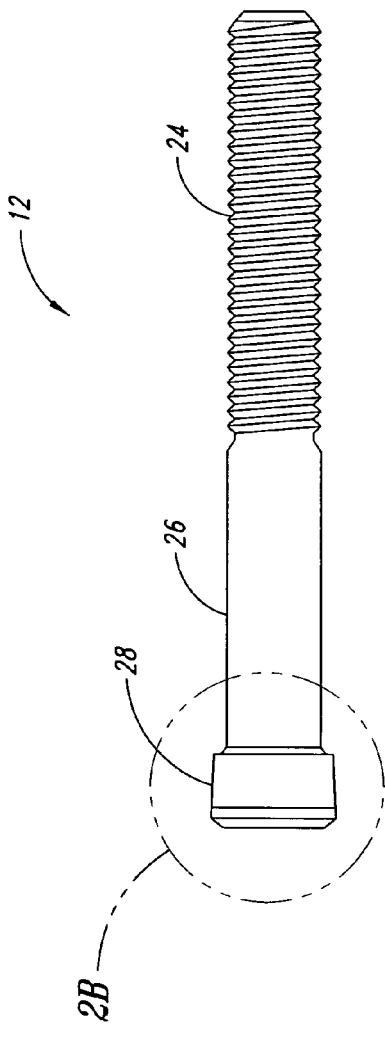
FIG. 2A is a side, elevational view of the mandrel of the sealed nut plate of FIG. 1.
Figure 2B:
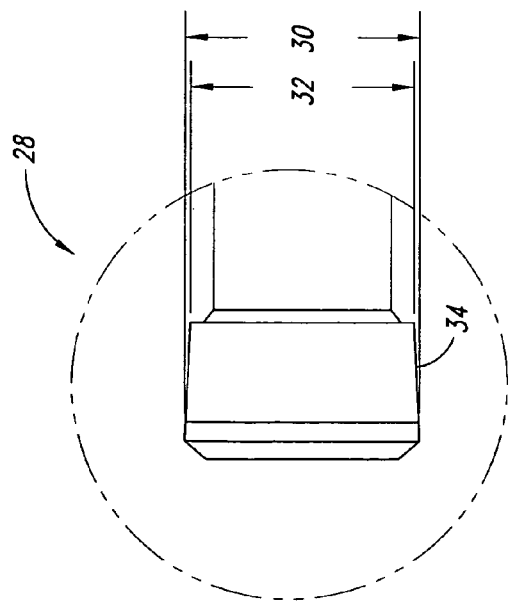
FIG. 2B is a detail view of a tapered head section of the mandrel of FIG. 2A.

In particular, FIGS. 2A and 2B show the mandrel 12, which includes an engagement section 24, a shank 26, and a tapered head section 28. In the illustrated embodiment, the engagement section 24 is threaded, which permits the engagement section 24 to be received and/or gripped by an installation tool (not shown). The threads on the engagement section 24 can conform to the American National (Unified) thread standards, which are the standards adopted in both the United States and Great Britain for all threaded fasteners (re: "Mechanical Engineering Design," 5$^{th}$ Ed., by Shigley and Mischke). Accordingly, the engagement section 24 having standard threads, can be adaptable into a variety of installation tools. However, it is also appreciated that the engagement section 24 can be configured with other engagement means such a flanges, grooves, etc. to allow the engagement section 24 to be gripped by specially designed installation tools. Referring to FIG. 2B, the tapered head section 28 includes a first outer perimeter 30 connected to a smaller, second outer perimeter 32 to form a tapered surface 34 therebetween.

FIG. 3 shows the retainer 14 having a first section 36 and a second section 38 connected by a portion 39 according to the illustrated embodiment. The first section 36 includes an inner perimeter 40 and an outer perimeter 42. The inner perimeter 40 is sized to receive the shank 26 of the mandrel 12. In addition, the inner perimeter 40 is slightly larger than the second outer perimeter 32 of the mandrel 12, yet smaller than the first outer perimeter 30 of the mandrel 12. The outer perimeter 42 of the first section 36 of the retainer 14 is sized to be closely received by the opening 20 in the structural workpiece 22. The second section 38 of the retainer includes an inner perimeter 44 that is sized to fit over a first outer perimeter 46 (FIG. 4A) of the cap 16. It is understood that the fit of the inner perimeter 44 of the retainer 14 over the outer perimeter 46 of the cap 16 as described herein can be a press fit, interference fit, a close fit in conjunction with a bonding agent, a shrink using temperature, or another type of fit-up process. The assembly of the nut plate 10 is described in more detail below.

FIGS. 4A and 4B show the cap 16, which includes a closed end 48 and an open end 50 according to the illustrated embodiment. The cap 16 further includes an inner profile 52 that is configured to complementarily receive a nut member 18. A shoulder 53 forms part of the inner profile 52 and restrains the nut member 18 in at least an axial direction, as discussed below in the description of the assembly process. The purpose of the closed end 48 is to seal or at least cover the opening 20 in the structural workpiece 22, for example when the nut plate 10 is being used in a wet environment such as a fuel tank of an airplane.

FIG. 5 shows the nut member 18 having a first inner perimeter 54, a first outer perimeter 56, and an outer profile 58 for complementarily being received by the inner profile 52 of the cap 16. In one embodiment, the first inner perimeter 54 is at least partially threaded to receive a fastener once the mandrel 12 has been removed. In another embodiment, the first inner perimeter 54 is configured to receive a component that is non-threaded. The first outer perimeter 56 is larger than the first inner perimeter 54, such that a first shoulder 60 is formed therebetween. The first shoulder 60 acts as an axial restraint for the tapered head section 28 of the mandrel 12. The outer profile 58 includes a second shoulder 62

Assembly of the Sealed Nut Plate

Figure 6:
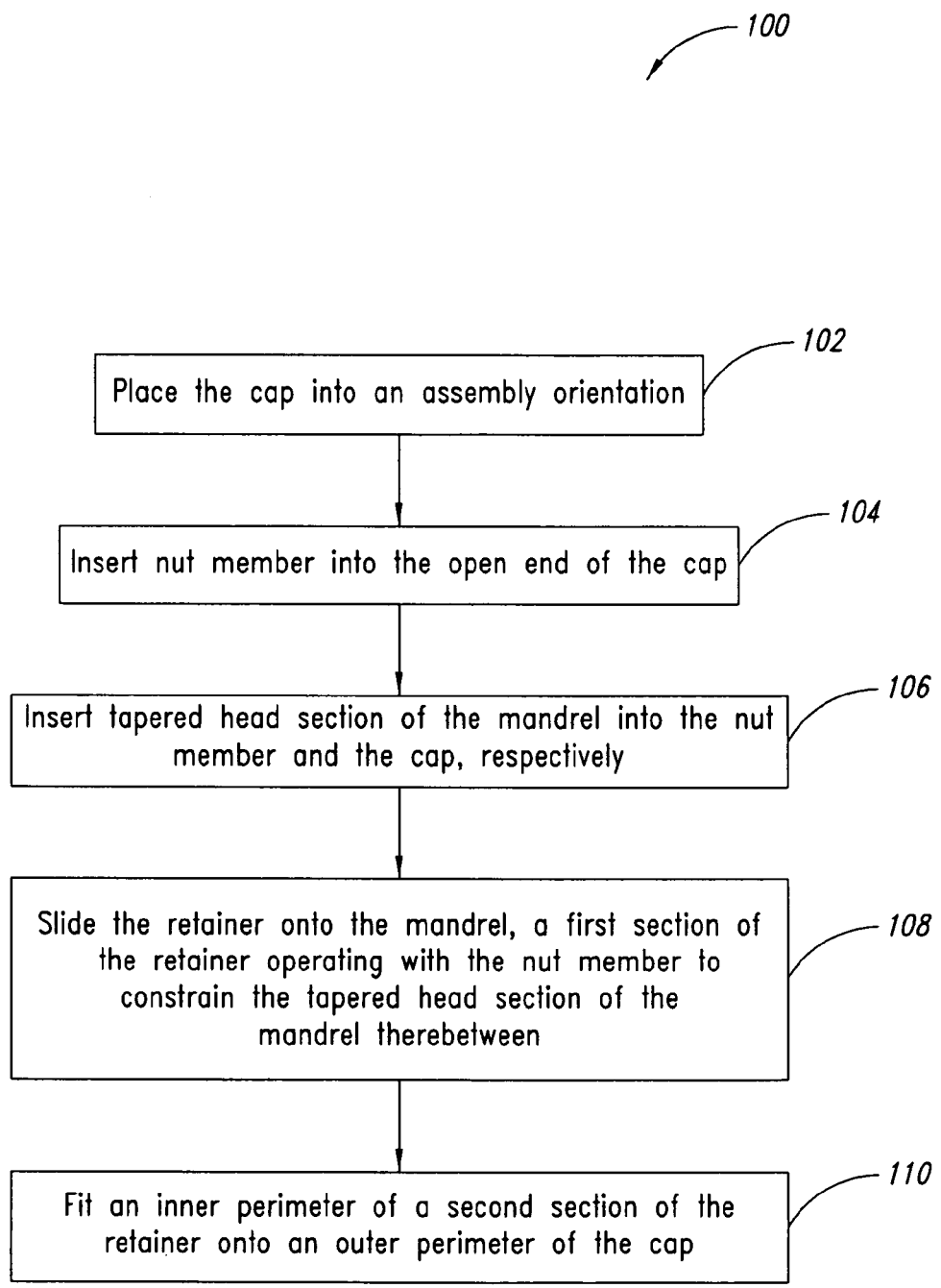
FIG. 6 is a flowchart showing a method of assembling the sealed nut plate of FIG. 1 according to one illustrated embodiment.
Figure 7:
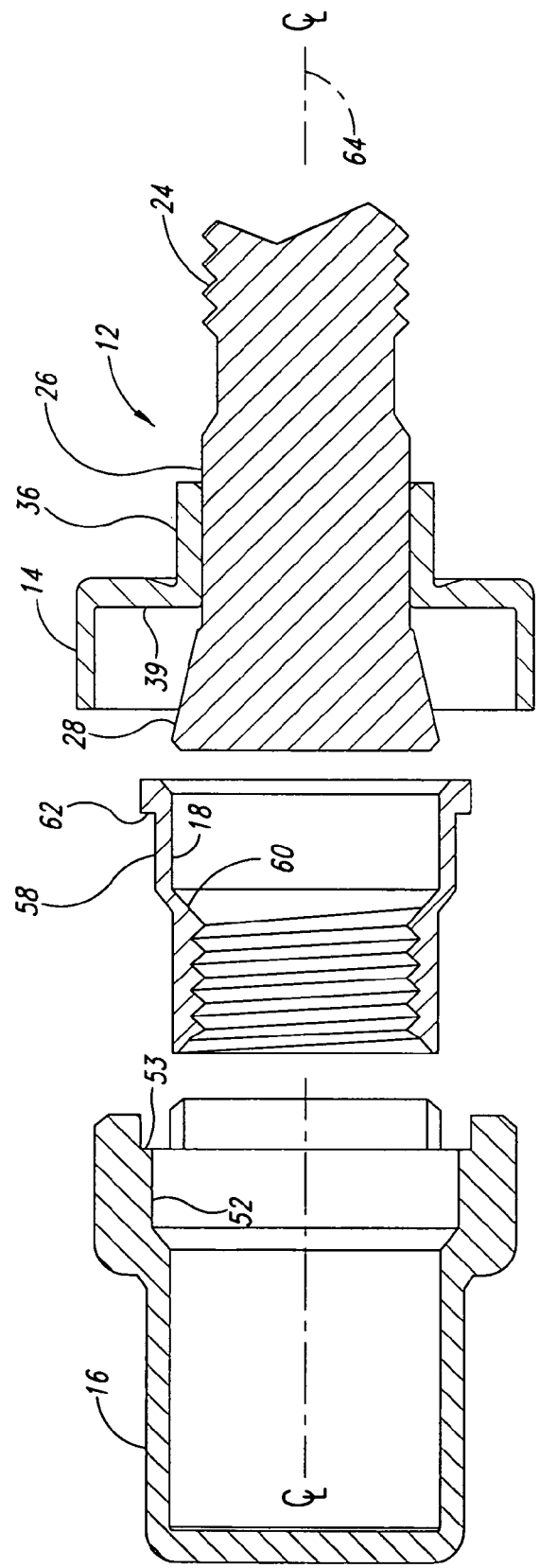
FIG. 7 is a cross sectional, exploded view of the sealed nut plate of FIG. 1.
Figure 8:
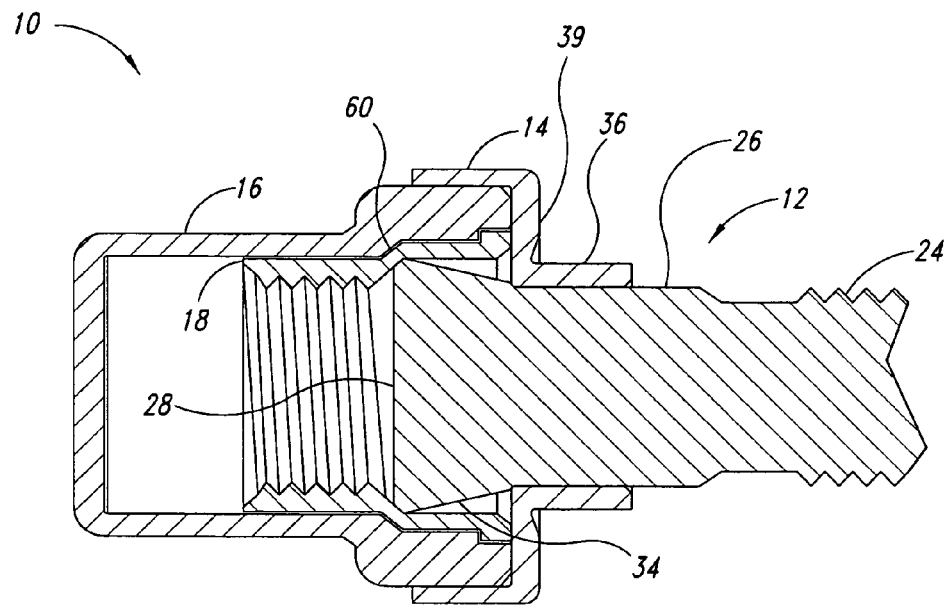
FIG. 8 is a cross-sectional view of the sealed nut plate of FIG. 1 in an assembled configuration.

FIG. 6 is a flowchart describing a method 100 for assembling the nut plate 10 according to one illustrated embodiment. The reader is also directed to FIGS. 7 and 8 to better appreciate the assembly method 100. At 102, the cap 16 is placed in an assembly orientation, which may be in a vertical orientation with the open end 50 of the cap 16 facing upward. However it is understood and appreciated that other assembly orientations of the cap 16 are permissible. At 104, the nut member 18 is inserted into the open end 50 of the cap 16. Referring briefly to FIGS. 7 and 8, note that the outer profile 58 of the nut member 18 complements the inner profile 52 of the cap 16. The shoulder 53 of the cap 16 is configured to contact the second shoulder 62 of the nut member 18, thus permitting the nut member 18 to be inserted into the cap 16 to a certain depth. In addition, the nut member 18 is axially constrained between the shoulder 53 of the cap 16 and the portion 39 of the retainer 14. It is appreciated that the nut member 18 in the illustrated embodiment is free-floating, such that the nut member 18 can have at least some amount of rotation or radial displacement with respect to a centerline 64. One advantage of the nut member 18 being free-floating is that the nut member 18 has some play, which allows the nut member 18 to receive a later-installed fastener that may be slightly misaligned with the centerline 64 of the nut member 18.

At 106, the tapered head section 28 of the mandrel 12 is inserted into the nut member 18 and cap 16, respectively. At 108, the retainer 14 is moved down the mandrel 12. The first section 36 of the retainer 14 is sized to fit over the engagement section 24, the shank 26, and the smaller, second outer perimeter 32, but not fit over the larger, first outer perimeter 30 of the mandrel 12. As shown in FIG. 8, the tapered surface 34 is axially constrained between the nut member 18 and the retainer 14 after the retainer 14 is in place. Specifically, the tapered surface 34 of the mandrel 12 is constrained between the first shoulder 60 of the nut member 18 and the portion 39 of the retainer 14.

At 110, the inner perimeter 44 of the second section 38 of the retainer 14 is fit over the first outer perimeter 46 of the cap 16. It is appreciated that there are a variety of methods of fitting the retainer onto the cap and it is understood that any of these methods can be utilized to achieve a secure fit between the retainer 14 and the cap 16.

Installation of the Sealed Nut Plate into the Structural Workpiece

FIGS. 9A-9D illustrate the installation of the nut plate 10 into the opening 20 of the structural workpiece 22. The engagement section 24 of the mandrel 12, the shank 26 of the mandrel 12, and the first section 36 of the retainer 14 are placed into the opening 20 of the structural workpiece 22 such that the outer perimeter of the first section 36 is closely received by the opening 20.

Figure 9A:
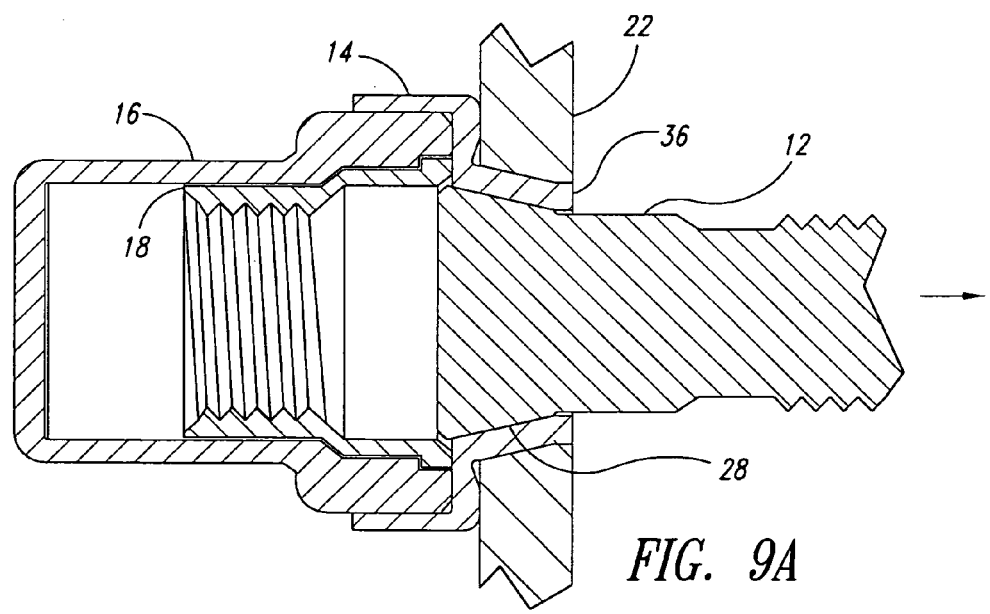
FIG. 9A is a cross-sectional view of the sealed nut plate of FIG. 1 being partially installed into an opening of a structural workpiece.

FIG. 9A illustrates the tapered head section 28 of the mandrel 12 beginning to be pulled through the first section 36 of the retainer 14. For illustration purposes, the radial expansion of the retainer 14 and that of the opening 20 is exaggerated. The material of the first section 36 of the retainer 14 is radially displaced into the material of the structural workpiece 22 that defines the opening 20. The tapered head section 28 cold works the first section 36 of the retainer 14 and may further cold work the material of the structural workpiece 22 to provide a fatigue benefit by creating compressive, residual stresses in the material surrounding and/or adjacent to the opening 20.

Figure 9B:
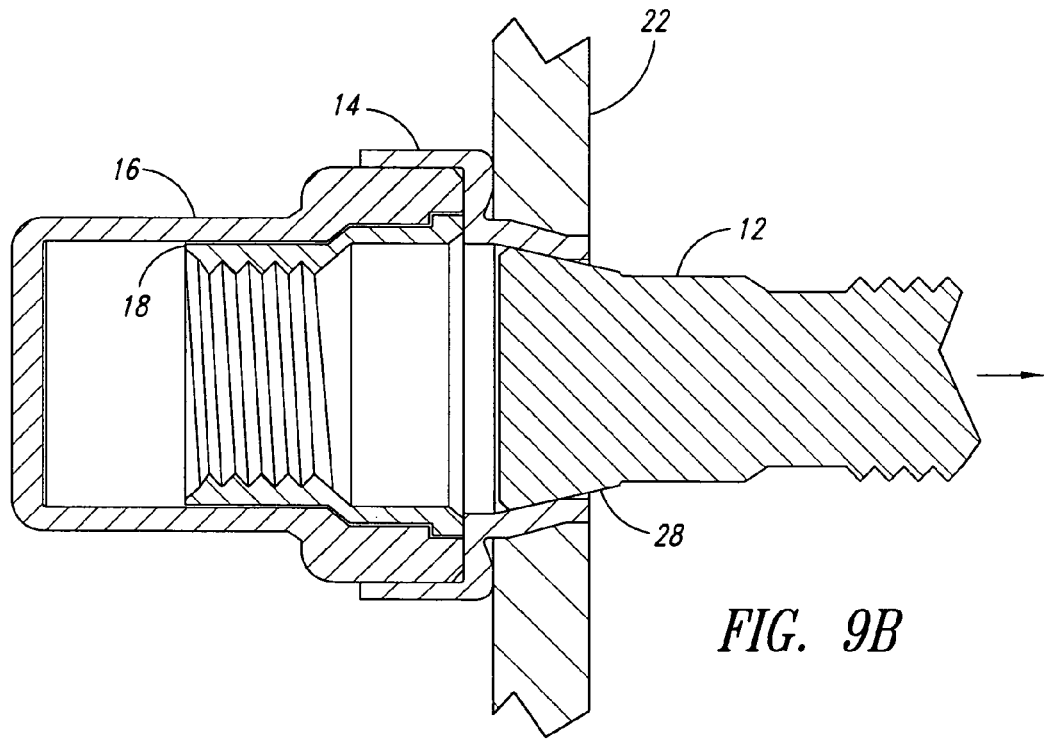
FIG. 9B is a cross-sectional view of the sealed nut plate of FIG. 1 almost fully installed into the opening of the structural workpiece.
Figure 9C:
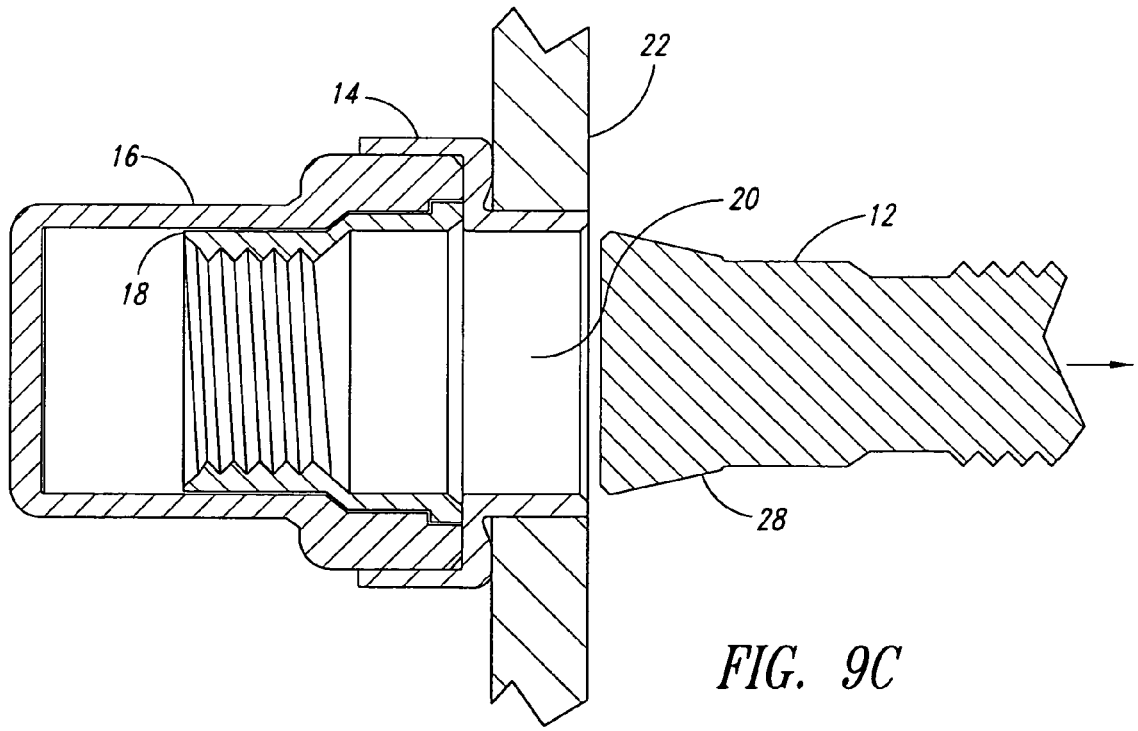
FIG. 9C is a cross-sectional view of the sealed nut plate of FIG. 1 fully installed into the opening of the structural workpiece.
Figure 9D:
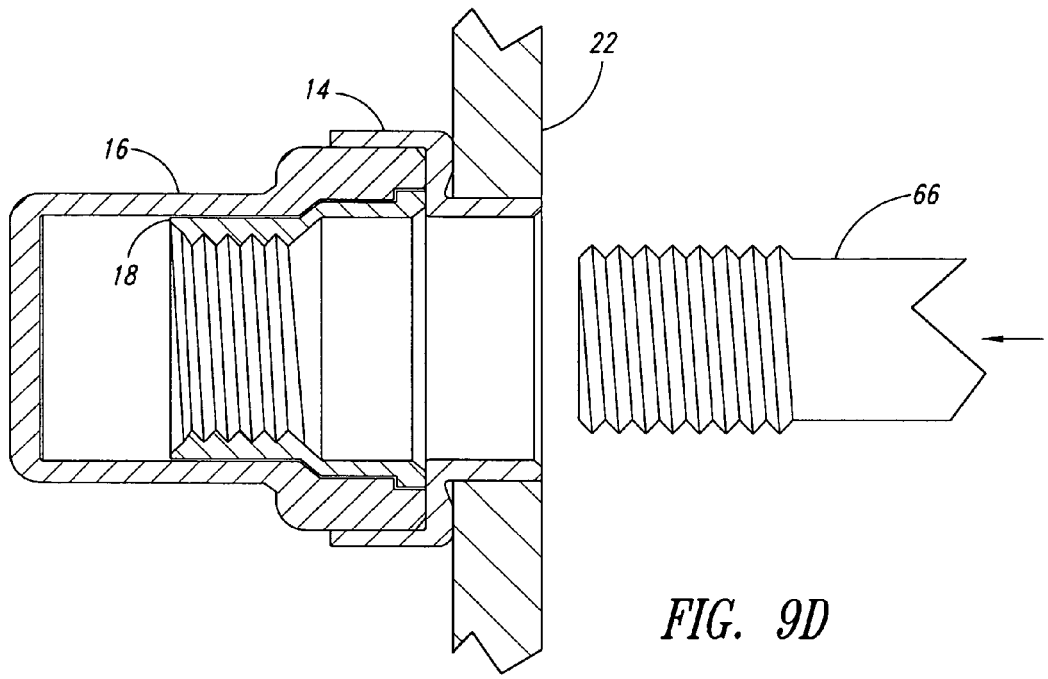
FIG. 9D is a cross-sectional view of the sealed nut plate of FIG. 1 installed into the structural workpiece and about to receive an externally threaded bolt.

FIG. 9B shows the tapered head section 28 progressing through the retainer 14 and opening 20, respectively. It is appreciated that forcibly pulling the mandrel 12 through the retainer 14 and the opening 20 can plastically increase the respective perimeters of these components where they have been cold worked. FIG. 9C shows the tapered head section 28 of the mandrel 12 clearing the opening 20. The mandrel 12 can be reused or disposed. If reused, the mandrel 12 could be returned to a manufacturer to be re-assembled into another nut plate 10. The manufacturer of the nut plate 10 may or may not provide a refund or other incentive to encourage the return of the mandrels 12. FIG. 9D shows a bolt 66 having external threads being inserted into the nut plate 10, after the nut plate 10 is installed into the opening 20 of the structural workpiece 22.

One advantage of the nut plate 10 is that the cap 16 seals the opening 20 in the structural workpiece 22 even if there is no bolt 66 inserted into the nut member 18. This inhibits or prevents debris from entering the sealed side of the structural workpiece, which would otherwise require tedious and time-consuming cleaning. Another advantage is that the cap 16 is pre-assembled with the nut member 18 and retainer 14, which eliminates the act of placing a cap over the opening 20 after the installation of the nut plate 10, which makes the installation process fast and efficient, and reduces the overall number of parts. This may be a substantial savings, particularly where hundreds, or even thousands, of nut plates 10 are installed, for example on a commercial airliner.

Yet another advantage is a redundant and robust seal developed by the fit between the cap 16 and the retainer 14 in conjunction with the radial expansion of the first section 36 of the retainer 14 in the opening 20 of the structural workpiece. In one embodiment, the redundancy and robustness of the seal is due in part because of an interference fit between the cap 16 and the retainer 14.

Yet another advantage is that the closed end 48 of the cap 16 can be located far enough from the first inner perimeter 54 of the nut member 18 to allow fasteners (e.g., screws, bolts, etc.) of varying grip lengths to be used in the installed nut plate 10.

Still yet another advantage is that the nut plate 10 weighs approximately one-third less than other known nut plates and/or threaded inserts. This weight reduction is particularly important in many industries, especially the aerospace industry.

Sealed, Non-Threaded Nut Plate

Figure 10:
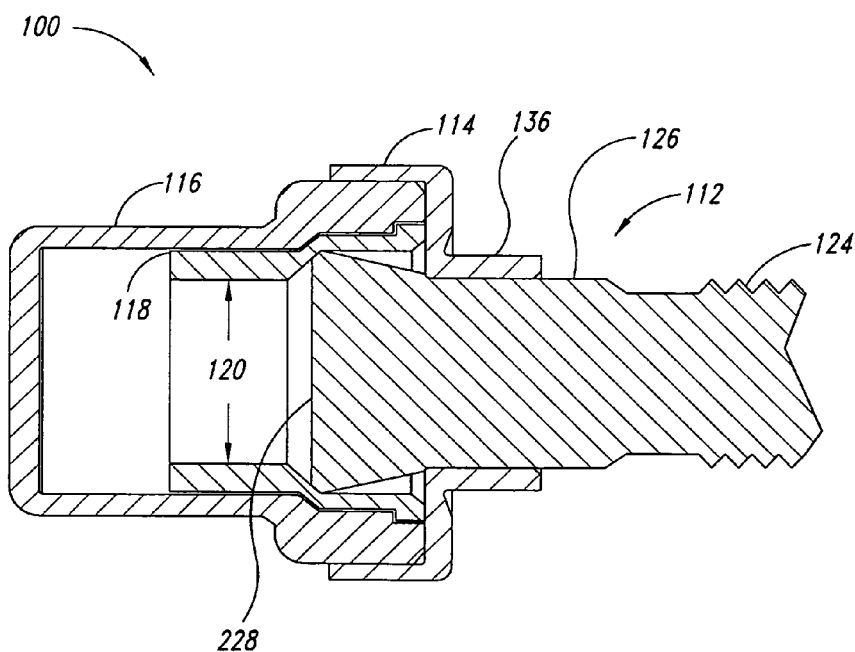
FIG. 10 is a cross-sectional view of a sealed, non-threaded nut plate comprising a mandrel, a retainer, a cap, and a nut member according to one illustrated embodiment.

FIG. 10 shows a sealed, nut plate 100 having a mandrel 112, a retainer 114, a cap 116, and a nut member 118. The components of the nut plate 100, with the exception of the nut member 118, are structurally and functionally similar to their counterpart components described in the original embodiment herein. Thus in the interest of brevity, the structurally and functionally similar components will not be described in detail.

It is understood and appreciated that an inner perimeter 120 of the nut member 118 can be circular, elliptical, or some other shape. In the illustrated embodiment, the inner perimeter 120 of the nut member 118 is smooth or may have a customized profile to receive a non-threaded device. The inner perimeter 120 of the nut member 118 can form a close and/or interference fit with a rod, a shaft, bushing, bearing, or some other structural/mechanical device. Further, the nut member 118 may be resiliently, radially expandable to permit the non-threaded device, for example, to be press fit into the nut member 18.

Non-Sealed Nut Plate

Figure 11:
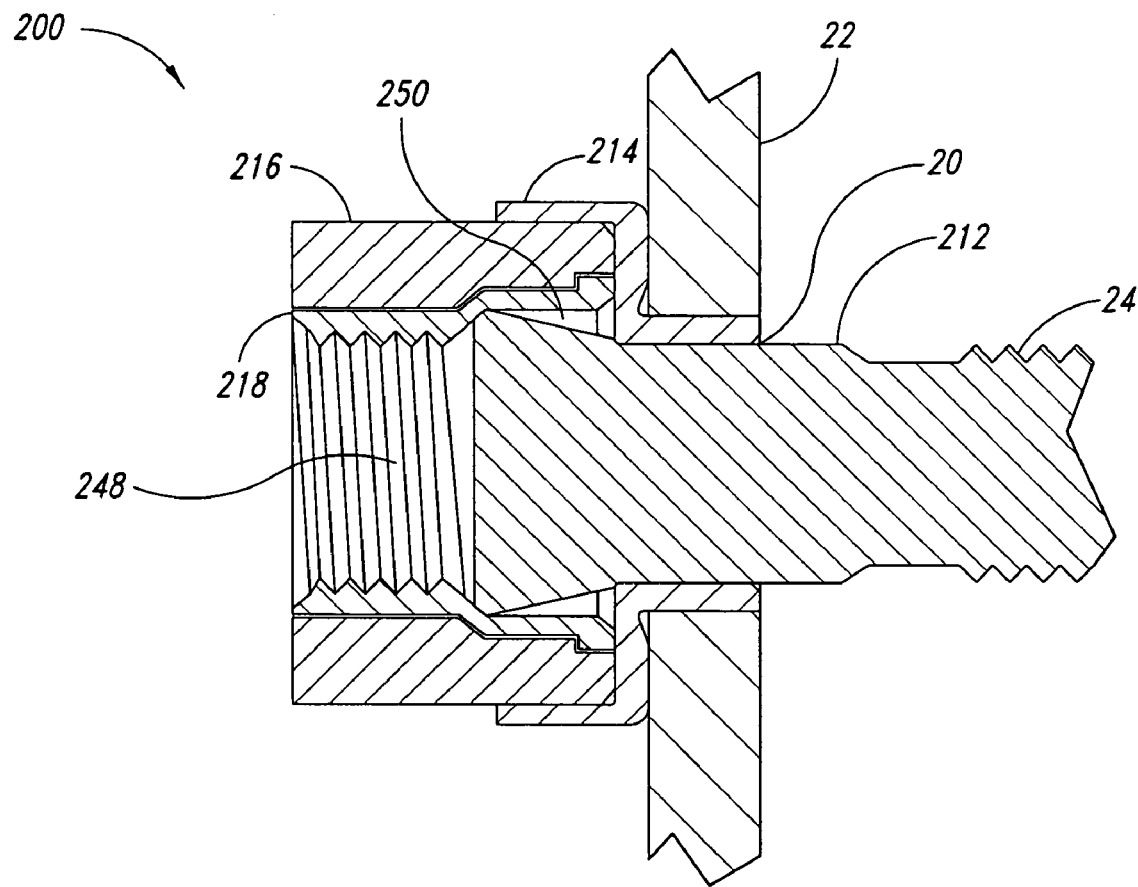
FIG. 11 is a cross-sectional view of a non-sealed nut plate comprising a mandrel, a retainer, a collar, and a nut member according to one illustrated embodiment.

FIG. 11 shows a non-sealed nut plate 200 having a mandrel 212, a retainer 214, a collar 216, and a nut member 218 installed into the opening 20 of the structural workpiece 22 according to the illustrated embodiment. The components of the nut plate 200, with the exception of the collar 216, are structurally and functionally similar to as their counterpart components described in the original embodiment herein. Thus in the interest of brevity, the structurally and functionally similar components will not be described in detail. In the present embodiment, the collar 216 includes a first open end 248 and a second open end 250. Accordingly, the collar 216 does not seal the opening 20.

Nut Plate with a Retaining Ring

Figure 12:
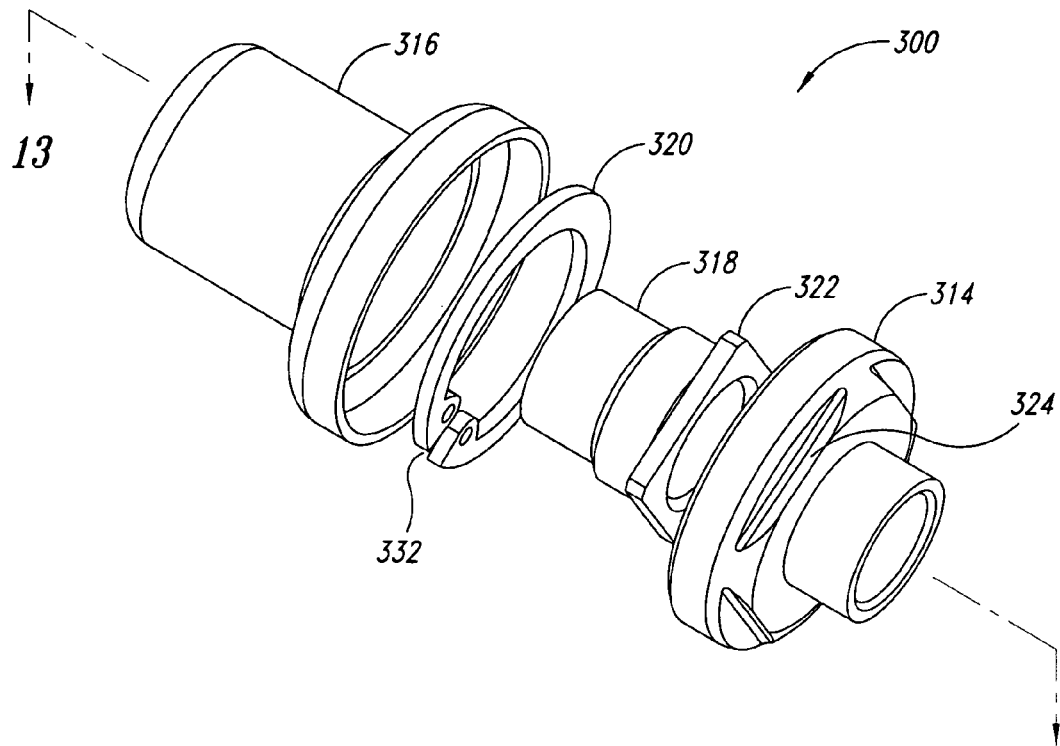
FIG. 12 is a top, left, isometric, exploded view of a retainer, a retaining ring, a nut member, and a cap for a nut plate assembly according to one illustrated embodiment.
Figure 13:
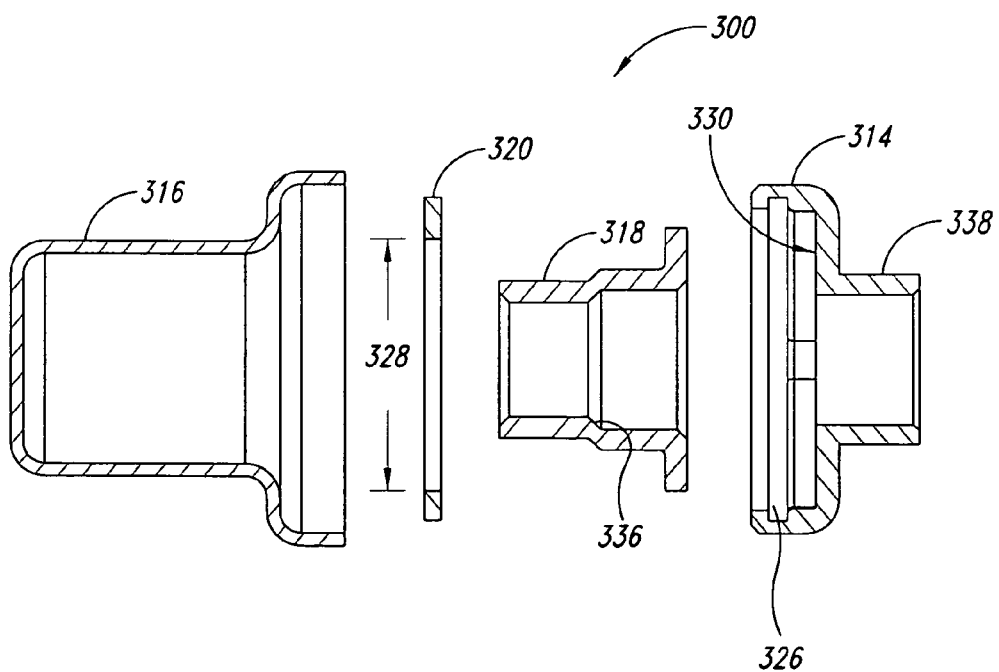
FIG. 13 is a cross-sectional, exploded view of the retainer, the retaining ring, the nut member, and the cap of FIG. 12.
Figure 14:
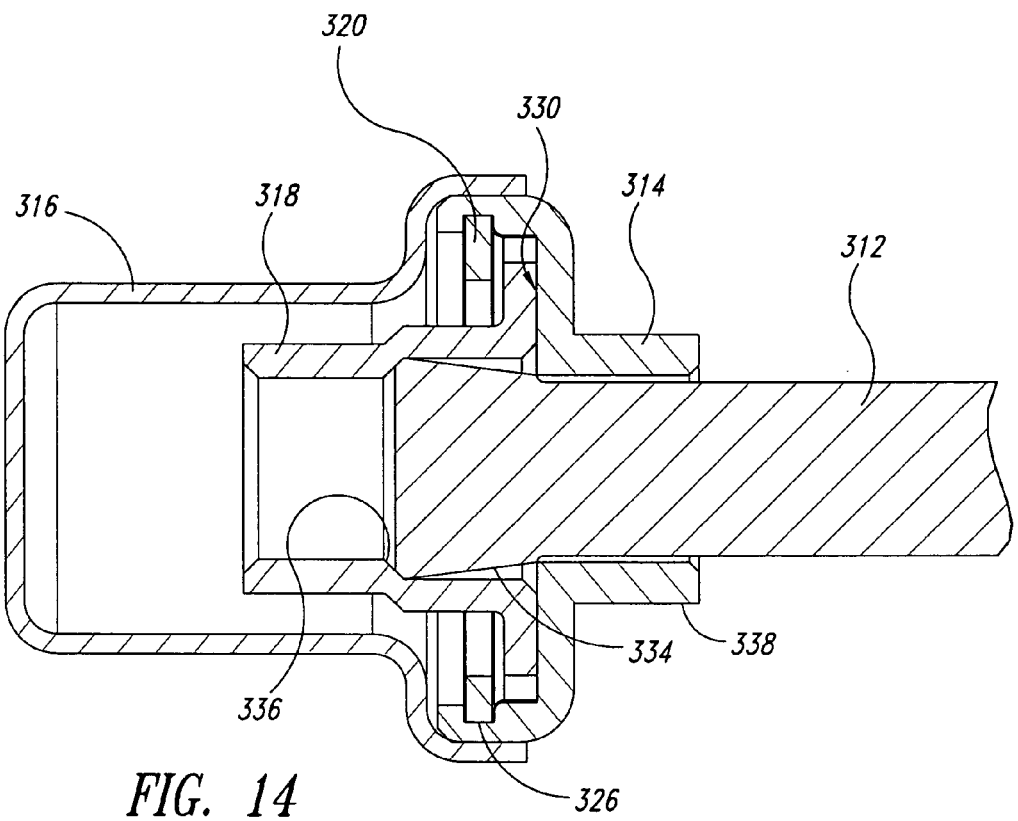
FIG. 14 is a cross-sectional view of the retainer, the retaining ring, the nut member, and the cap of FIG. 12 assembled with a mandrel.

FIGS. 12-14 show a nut plate 300 having a mandrel 312, a retainer 314, a cap 316, a nut member 318, and a retaining ring 320 according to the illustrated embodiment. In the interest of brevity, only differences from previously discussed embodiments will be described in detail herein.

The nut member 318 includes a non-circular end section 322. The retainer 314 includes a plurality of notches 324 formed to receive the non-circular end section 322 of the nut member 318. The notches 324 operate with the end section 322 of the nut member 318 to limit or prevent the nut member 318 from rotating, especially when a fastener is later threaded into the nut member 318.

The retainer 314 further includes a groove 326, which is best seen in FIG. 13, to receive the retaining ring 320. The retaining ring 320 includes an inner diameter 328 sized to operate with the retainer 314 to capture the end section 322 of the nut member 318 between a first surface 330 of the retainer 314 and the retaining ring 320 as best seen in FIG. 14. In addition, the retaining ring 320 includes a slot 332 (FIG. 12) which permits the retaining ring 320 to be adjustably sized for insertion or removal from the groove 326 formed in the retainer 314.

FIG. 14 shows the nut plate 300 with a tapered head section 334 of mandrel 312 in the nut member 318 and captured between a first shoulder 336 of the nut member 318 and the retainer 314. Similar to the previously described embodiments, the tapered head section 334 of the mandrel 312 is forcibly pulled through the retainer 314 to radially expand a first section 338 of the retainer 314.

Non-Sealed Threaded Insert

Figure 15:
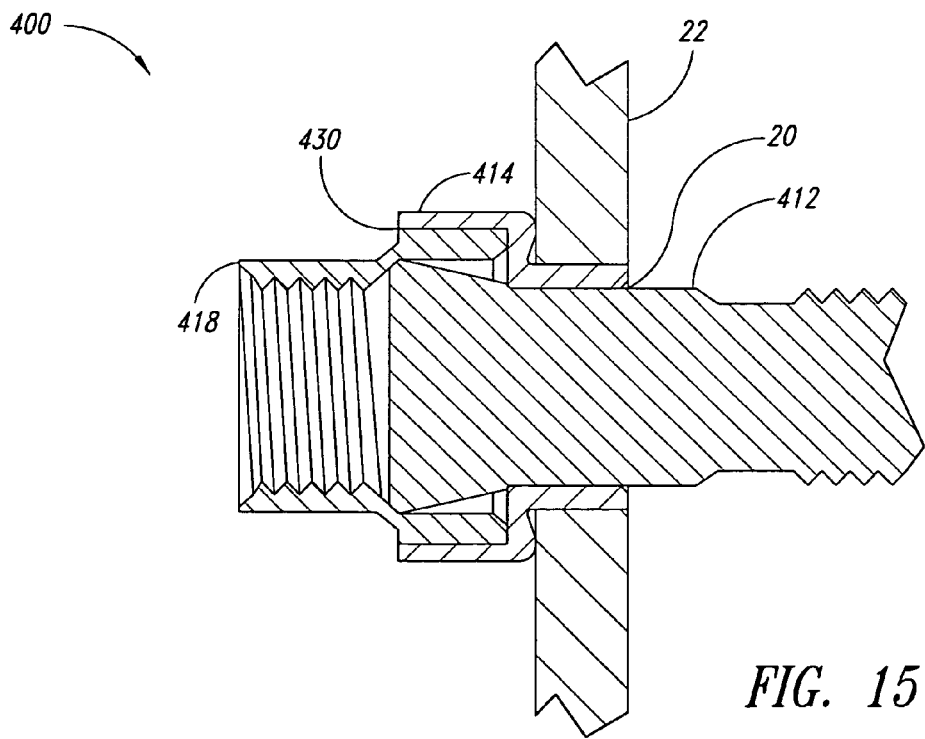
FIG. 15 is a cross-sectional view of a threaded insert comprising a mandrel, a retainer, and a nut member having two open ends according to one illustrated embodiment.

FIG. 15 shows a non-sealed threaded insert 400 having a mandrel 412, a retainer 414, and a nut member 418 installed into the opening 20 of the structural workpiece 22 according to the illustrated embodiment. The components of the threaded insert 400 are structurally and functionally similar to their counterpart components described in the original embodiment herein. Thus in the interest of brevity, the structurally and functionally similar components will not be described in detail.

Figure 16:
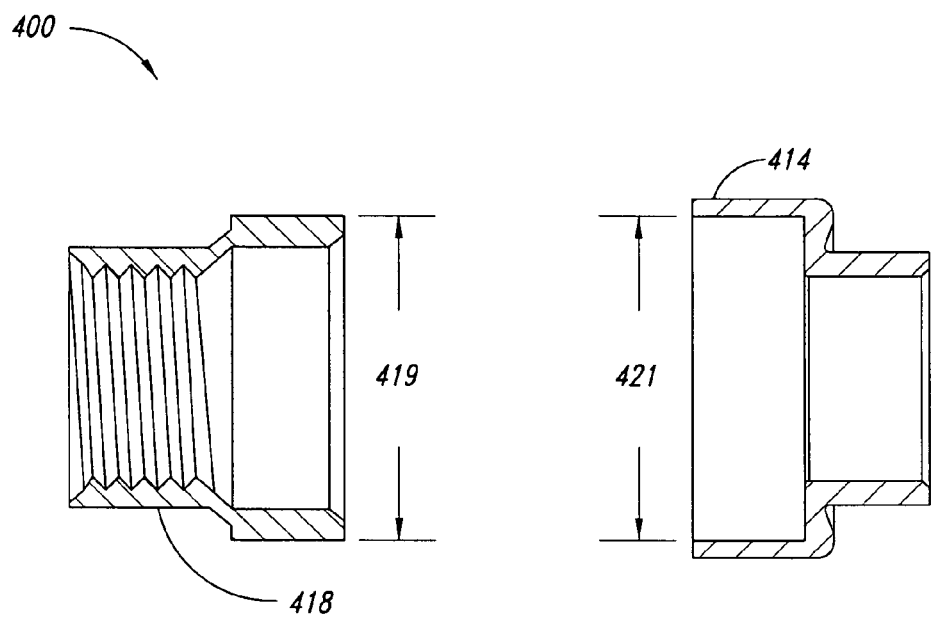
FIG. 16 is a cross-sectional, exploded view of the retainer and the nut member of the threaded insert of FIG. 15 according to one illustrated embodiment.

In the illustrated embodiment however, the cap 16, 116, or collar 216 is eliminated. As shown in FIGS. 15 and 16, the nut member 418 includes an outer perimeter 419 sized to form an interference fit with an inner perimeter 421 of the retainer 414. In addition, the nut member 418 is internally threaded for receiving an externally threaded fastener at a later time. It is understood that a bonding agent may be used between the interface of the retainer 414 and the nut member 418.

It is appreciated that the interference fit between the nut member 418 and the retainer 414 precludes the nut member 418 from being free floating within the assembled threaded insert 400. Thus, the elimination of any "play" or "float" between the retainer 414 and the nut member 418 categorizes the illustrated assembly as a threaded insert.

Sealed Threaded Insert

Figure 17:
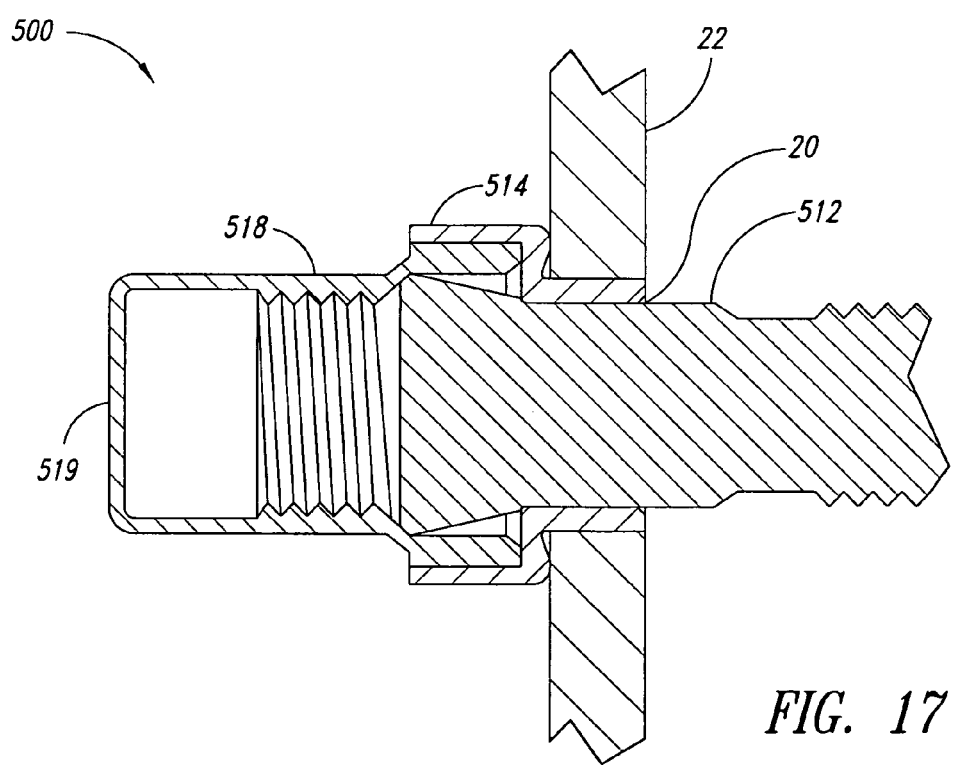
FIG. 17 is a cross-sectional view of a sealed threaded insert comprising a mandrel, a retainer, and a nut member having one closed end and one open end according to one illustrated embodiment.

FIG. 17 shows a sealed threaded insert 500 having a mandrel 512, a retainer 514, and a nut member 518 installed into the opening 20 of the structural workpiece 22 according to the illustrated embodiment. The present embodiment is similar to the previously described embodiment with the exception that the nut member 518 includes a closed end 519. The closed end 519 seals the opening 20, similar the way the cap 16, 116, described above, sealed the opening 20.

The various embodiments described above can be combined to provide further embodiments. All of the above U.S. patents, patent applications and publications referred to in this specification as well as U.S. patent application Ser. No. 10/928,641; and U.S. patent application Ser. No. 10/965,233, are incorporated herein by reference. Aspects can be modified, if necessary, to employ devices, features, and concepts of the various patents, applications and publications to provide yet further embodiments.

These and other changes can be made in light of the above detailed description. In general, in the following claims, the terms used should not be construed to limit the invention to the specific embodiments disclosed in the specification and the claims, but should be construed to include all types of fastener assemblies that operate in accordance with the claims. Accordingly, the invention is not limited by the disclosure, but instead its scope is to be determined entirely by the following claims.

What is claimed is:

1. A fastener assembly installable in an opening of a structural workpiece via a work tool, the fastener assembly comprising:

an elongated mandrel having a first end, a second end opposed to the first end, a head section formed proximate the first end, and an engagement section formed proximate the second end, at least a portion of the head section having an outer tapered perimeter formed by a first perimeter tapering down to a second perimeter, and wherein the engagement section is selectively engageable by the work tool;

a nut member having a passage formed therein, the passage including a first section and a second section, the first section having a first inner perimeter, the second section having a second inner perimeter that is larger than the first inner perimeter, wherein a transition between the first inner perimeter and the second inner perimeter forms a nut member shoulder; and a retainer having a first section and a second section, the first section of the retainer cooperates with the nut member to capture the head section of the mandrel substantially between the nut member shoulder and a portion of the retainer, such that the head section extends along a longitudinally extending portion of the passage formed by the second section of the nut member until the mandrel is forcibly withdrawn from the retainer, the second section of the retainer includes a second inner perimeter sized to be slightly smaller than the second perimeter of the head section of the mandrel.

2. The fastener assembly of claim 1, further comprising:

a cap having an open end and a closed end, the open end having an outer perimeter and an inner perimeter, the outer perimeter sized to closely receive the retainer, the inner perimeter of the open end sized to loosely receive the nut member.

3. The fastener assembly of claim 1 wherein at least a portion of the first inner perimeter of the first section of the nut member is threaded.

4. The fastener assembly of claim 1 wherein at least a portion of the first inner perimeter of the first section of the nut member is unthreaded.

5. The fastener assembly of claim 1 wherein the engagement section of the mandrel is threaded.

6. A fastener assembly configured to be installed in an opening of a structural workpiece, the fastener assembly comprising:

a first component having an outer perimeter and an inner perimeter;

a retainer having a first section and a second section, the first section having an inner perimeter sized to closely receive the first component, the second section having an inner perimeter and an outer perimeter, the outer perimeter of the second section sized to be closely received by the opening of the structural workpiece;

a nut member having an outer perimeter and an inner perimeter, at least a portion of the outer perimeter of the nut member configured to be received by the first component, the inner perimeter of the nut member formed about a nut member passage; and a mandrel having a tapered head section and an engagement section, the tapered head section having a first outer perimeter spaced apart from a second outer perimeter with a tapered surface formed therebetween, at least a portion of the tapered head section larger than the inner perimeter of the second section of the retainer, the tapered head section located within the nut member passage until the tapered head section of the mandrel is forcibly pulled to radially expand the inner perimeter of the second section of the retainer.

7. The fastener assembly of claim 6 wherein the first component includes a closed end and an open end, the open end for receiving the nut member.

8. The fastener assembly of claim 6 wherein the first component includes a shoulder to axially restrain the nut member in a first direction.

9. The fastener assembly of claim 6 wherein at least a portion of the inner perimeter of the nut member is threaded.

10. The fastener assembly of claim 6 wherein the inner perimeter of the first section of the retainer forms an interference fit with the outer perimeter of the first component.

11. The fastener assembly of claim 6 wherein the engagement section of the mandrel is threaded.

12. A method for manufacturing a fastener assembly, the method comprising:
    inserting a nut member into an open end of a first component, the nut member being axially constrained in a first direction by a portion of the first component;
    inserting a tapered head section of a mandrel at least partially into the nut member, an elongated portion of the mandrel extending from the tapered head section of the mandrel; and
    engaging an inner perimeter of a first section of a retainer with an outer perimeter of the first component, the retainer having a second section with an inner perimeter sized to maintain the tapered head section of the mandrel substantially within the nut member until the tapered head section is forcibly removed from the fastener assembly.

13. The method of claim 12 wherein engaging an inner perimeter of a first section of a retainer with an outer perimeter of the first component includes forming an interference fit between the inner perimeter of the first section of the retainer with the outer perimeter of the first component.

14. The method of claim 12 wherein inserting the tapered head section of the mandrel at least partially into the nut member includes the tapered head section contacting a shoulder of the nut member.

15. The method of claim 12 wherein the elongated portion of the mandrel includes an engagement section.

16. A fastener assembly installable in an opening of a structural workpiece comprising:
    means for retaining the fastener assembly in the opening of the structural workpiece, the means for retaining having an outer perimeter of a first section sized to be closely received by the opening;
    means for radially expanding the first section of the means for retaining, the means for radially expanding forming part of the fastener assembly until the means for radially expanding is forcibly removed from the fastener assembly; and
    means for receiving the means for radially expanding and for threadably coupling to a threaded component after the means for radially expanding is removed from the means for receiving, wherein an end of the means for radially expanding extends longitudinally along a passage of the means for receiving.

17. The fastener assembly of claim 16, further comprising:
    means for sealing the opening in the structural workpiece, wherein the means for sealing is coupled with the means for retaining.

18. The fastener assembly of claim 16 wherein the means for radially expanding the first section comprises a mandrel.

19. The fastener assembly of claim 16 wherein the means for receiving the means for radially expanding and for threadably coupling to the threaded component comprises a nut member, wherein the nut member includes a first section and a second section, the first section has a first inner perimeter, the second section has a second inner perimeter that is larger than the first inner perimeter, and a transition between the first inner perimeter and the second inner perimeter forms a nut member shoulder.

20. The fastener assembly of claim 1 wherein the head section extends through at least most of the second section of the nut member prior to the mandrel being forcibly withdrawn from the retainer.

21. The fastener assembly of claim 1 wherein a free end of the head section of the elongated mandrel is positioned substantially midway between opposing ends of the nut member prior to the mandrel being forcibly withdrawn from the retainer, the passage extends along a longitudinal length of the nut member between the opposing ends.

22. The fastener assembly of claim 1 wherein the head section of the elongated mandrel is between the nut member shoulder and the portion of the retainer, such that the second section of the nut member is pulled against the portion of the retainer as the head section of the elongated mandrel is pulled through an opening of the second section.

23. The fastener assembly of claim 6 wherein the tapered head section extends through a tubular section of the nut member, an end of the tubular section is pulled towards the retainer as the mandrel is forcibly pulled to move the tapered head section out of the end of the tubular section to radially expand the inner perimeter of the second section of the retainer.

24. The method of claim 12 wherein inserting the tapered head section of the mandrel at least partially into the nut member includes moving the tapered head section through an opening of the nut member and moving the tapered head section along a longitudinally extending passage of the nut member.

* * * * *

UNITED STATES PATENT AND TRADEMARK OFFICE
CERTIFICATE OF CORRECTION

PATENT NO. : 7,641,430 B2
APPLICATION NO. : 11/445951
DATED : January 5, 2010
INVENTOR(S) : Johnson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 540 days.

Signed and Sealed this

Sixteenth Day of November, 2010

David J. Kappos
*Director of the United States Patent and Trademark Office*